(12) United States Patent
Tiew (10) Patent No.: US 9,886,142 B2
(45) Date of Patent: Feb. 6, 2018

(54) CAPACITIVE TOUCH SENSING SYSTEM

(71) Applicant: PIXART IMAGING INC., Hsin-Chu County (TW)

(72) Inventor: Kei-Tee Tiew, Selangor (MY)

(73) Assignee: PIXART IMAGING INC., Hsin-Chu County (TW)

( * ) Notice: Subject to any disclaimer, the term of this patent is extended or adjusted under 35 U.S.C. 154(b) by 76 days.

(21) Appl. No.: 14/095,007

(22) Filed: Dec. 3, 2013

(65) Prior Publication Data

US 2015/0153868 A1    Jun. 4, 2015

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ..................................... G06F 3/044
USPC ........................................ 345/174
See application file for complete search history.

(56) References Cited

U.S. PATENT DOCUMENTS

| | | | | |
|---|---|---|---|---|
| 5,305,017 A * | 4/1994 | Gerpheide | ............ | G06F 3/0213 345/168 |
| 5,565,658 A * | 10/1996 | Gerpheide | .............. | G06F 3/041 178/18.02 |
| 5,623,225 A * | 4/1997 | Traylor | ................... | H04L 27/14 329/302 |
| 5,920,309 A * | 7/1999 | Bisset | ..................... | G06F 3/044 178/18.06 |
| 6,025,726 A * | 2/2000 | Gershenfeld | .......... | B60N 2/002 324/662 |
| 6,075,520 A * | 6/2000 | Inoue | ..................... | G06F 3/044 178/18.01 |
| 6,229,856 B1 * | 5/2001 | Diab | .................. | A61B 5/14551 375/316 |
| 6,396,484 B1 * | 5/2002 | Adler | .................... | G06F 3/0436 345/173 |
| 6,498,590 B1 * | 12/2002 | Dietz | ..................... | G06F 3/038 323/904 |
| 7,078,918 B2 * | 7/2006 | Umeda | ................. | G06K 9/0002 324/679 |

(Continued)

FOREIGN PATENT DOCUMENTS

TW       201346688 A    11/2013

OTHER PUBLICATIONS

En-Feng Hsu; Ken Crandall; Hsin-Chia Chen; Ming-Tsan Kao; U.S. Appl. No. 13/746,883, filed Jan. 22, 2013.

*Primary Examiner* — Michael J Jansen, II
(74) *Attorney, Agent, or Firm* — Hauptman Ham, LLP (57) ABSTRACT

There is provided a capacitive touch sensing system including a touch panel, a plurality of amplification units, an analog signal processing unit and an AD converter. The touch panel includes a plurality of driving electrodes intersecting with a plurality of sensing electrodes. Each of the amplification units is coupled to one of the sensing electrodes so as to output an amplified sensing signal. The analog signal processing unit demodulates a differential signal of the amplified sensing signals outputted by two adjacent amplification units or demodulates the amplified sensing signal outputted by the amplification units to generate a dc signal. The AD converter converts the dc signal to a digital signal.

16 Claims, 5 Drawing Sheets

(56) References Cited

U.S. PATENT DOCUMENTS

| | | | | |
|---|---|---|---|---|
| 7,084,645 B1* | 8/2006 | Umeda | G06K 9/0002 | 324/679 |
| 7,277,817 B2* | 10/2007 | Hall et al. | | 702/150 |
| 7,406,393 B2* | 7/2008 | Ely | G06F 1/3203 | 702/150 |
| 8,031,180 B2* | 10/2011 | Miyamoto | G06F 3/0412 | 345/156 |
| 8,076,949 B1* | 12/2011 | Best | G06F 3/044 | 324/663 |
| 8,207,944 B2* | 6/2012 | Geaghan | G06F 3/044 | 178/18.06 |
| 8,232,977 B2* | 7/2012 | Zachut | G06F 3/0418 | 345/173 |
| 8,274,481 B2* | 9/2012 | Nishimura et al. | | 345/173 |
| 8,395,595 B2* | 3/2013 | Miyamoto | G06F 3/0412 | 315/156 |
| 8,400,422 B2* | 3/2013 | Chang | G06F 3/0416 | 345/173 |
| 8,451,234 B2* | 5/2013 | Sato | G02F 1/13338 | 178/18.01 |
| 8,493,331 B2* | 7/2013 | Krah | G06F 3/041 | 345/156 |
| 8,493,360 B2* | 7/2013 | Kremin | G06F 3/0416 | 178/18.06 |
| 8,519,970 B2* | 8/2013 | Westhues | G06F 3/0418 | 178/18.01 |
| 8,729,911 B2* | 5/2014 | Maharyta | G06F 3/0416 | 324/658 |
| 8,730,204 B2* | 5/2014 | Washburn | G06F 3/0418 | 178/18.06 |
| 8,766,931 B2* | 7/2014 | Westhues | G06F 3/044 | 178/18.06 |
| 8,803,835 B2* | 8/2014 | Li | G06F 3/044 | 178/18.06 |
| 8,810,537 B2* | 8/2014 | Yousefpor | G06F 3/0418 | 327/238 |
| 8,878,797 B2* | 11/2014 | Erdogan | G01R 27/2605 | 178/18.06 |
| 8,902,192 B2* | 12/2014 | Miyamoto | G06F 3/044 | 345/174 |
| 8,902,200 B2* | 12/2014 | Miyamoto | G06F 3/0416 | 345/175 |
| 8,928,622 B2* | 1/2015 | Wang | G06F 3/044 | 345/174 |
| 8,976,154 B2* | 3/2015 | Miyamoto | G06F 3/041 | 345/174 |
| 9,013,448 B2* | 4/2015 | Miyamoto | G06F 3/0416 | 178/18.06 |
| 9,030,441 B2* | 5/2015 | Yumoto | G06F 3/041 | 178/18.06 |
| 9,372,560 B2* | 6/2016 | Cho | G06F 3/041 | |
| 2003/0067451 A1* | 4/2003 | Tagg | G01V 3/088 | 345/174 |
| 2004/0217945 A1* | 11/2004 | Miyamoto | G06F 3/0412 | 345/173 |
| 2005/0109125 A1* | 5/2005 | Hall et al. | | 73/862.68 |
| 2005/0141263 A1* | 6/2005 | Umeda | G06K 9/0002 | 365/149 |
| 2006/0158202 A1* | 7/2006 | Umeda | G06K 9/0002 | 324/686 |
| 2007/0262966 A1* | 11/2007 | Nishimura et al. | | 345/173 |
| 2009/0127005 A1* | 5/2009 | Zachut | G06F 3/044 | 178/18.03 |
| 2009/0273573 A1* | 11/2009 | Hotelling | G06F 3/0362 | 345/173 |
| 2009/0277696 A1* | 11/2009 | Reynolds | G06F 3/03547 | 178/18.06 |
| 2010/0079401 A1* | 4/2010 | Staton | G06F 3/044 | 345/174 |
| 2010/0085325 A1* | 4/2010 | King-Smith | G06F 3/03545 | 345/174 |
| 2010/0194692 A1* | 8/2010 | Orr | G06F 3/0414 | 345/173 |
| 2011/0068810 A1* | 3/2011 | Yeates | G06F 3/0416 | 324/676 |
| 2011/0134076 A1* | 6/2011 | Kida | G06F 3/0412 | 345/174 |
| 2011/0210939 A1* | 9/2011 | Reynolds | G06F 3/0418 | 345/174 |
| 2011/0210940 A1* | 9/2011 | Reynolds | G06F 3/0418 | 345/174 |
| 2011/0210941 A1* | 9/2011 | Reynolds | G06F 3/0418 | 345/174 |
| 2011/0261007 A1* | 10/2011 | Joharapurkar | G06F 3/0418 | 345/174 |
| 2011/0298479 A1* | 12/2011 | Matsushima | G06F 3/044 | 324/658 |
| 2011/0310059 A1* | 12/2011 | Miyamoto | G06F 3/0412 | 345/174 |
| 2012/0013546 A1* | 1/2012 | Westhues | G06F 3/044 | 345/173 |
| 2012/0013564 A1* | 1/2012 | Westhues | G06F 3/044 | 345/174 |
| 2012/0013565 A1* | 1/2012 | Westhues | G06F 3/0418 | 345/174 |
| 2012/0043140 A1* | 2/2012 | Peterson | G06F 3/0416 | 178/18.06 |
| 2012/0194469 A1* | 8/2012 | Wang | G06F 3/044 | 345/174 |
| 2012/0268142 A1* | 10/2012 | Kremin | G06F 3/044 | 324/658 |
| 2012/0268397 A1* | 10/2012 | Lee | G06F 3/044 | 345/173 |
| 2012/0326734 A1* | 12/2012 | Cho | G06F 3/0416 | 324/684 |
| 2013/0021294 A1* | 1/2013 | Maharyta | G06F 3/044 | 345/174 |
| 2013/0076646 A1* | 3/2013 | Krah | G06F 3/0414 | 345/173 |
| 2013/0147732 A1* | 6/2013 | Peterson | G06F 3/0416 | 345/173 |
| 2013/0162586 A1* | 6/2013 | Erdogan | G06F 3/0416 | 345/174 |
| 2013/0207906 A1* | 8/2013 | Yousefpor | G06F 3/0418 | 345/173 |
| 2013/0271426 A1* | 10/2013 | Yumoto | G06F 3/041 | 345/174 |
| 2013/0278555 A1* | 10/2013 | Cho | G06F 3/041 | 345/174 |
| 2013/0300690 A1* | 11/2013 | Yang | G06F 3/0416 | 345/173 |
| 2013/0321341 A1* | 12/2013 | Takahama | G06F 3/044 | 345/174 |
| 2013/0321343 A1* | 12/2013 | Miyamoto | G06F 3/0416 | 345/175 |
| 2014/0035863 A1* | 2/2014 | Li et al. | | 345/174 |
| 2014/0077823 A1* | 3/2014 | Angelini et al. | | 324/658 |
| 2014/0132541 A1* | 5/2014 | Miyamoto | G06F 3/041 | 345/173 |
| 2014/0132561 A1* | 5/2014 | Miyamoto | G06F 3/0418 | 345/174 |
| 2014/0152602 A1* | 6/2014 | Miyamoto | G06F 3/0416 | 345/174 |
| 2014/0160070 A1* | 6/2014 | Miyamoto | G06F 3/0416 | 345/174 |
| 2014/0204046 A1* | 7/2014 | Hsu | G06F 3/044 | 345/174 |
| 2014/0204053 A1* | 7/2014 | Crandall | G06F 3/0418 | 345/174 |
| 2014/0240278 A1* | 8/2014 | Kim | G06F 3/044 | 345/174 |
| 2014/0267143 A1* | 9/2014 | Worfolk | G06F 3/0416 | 345/174 |
| 2014/0375595 A1* | 12/2014 | Lin et al. | | 345/174 |
| 2015/0029146 A1* | 1/2015 | Coni | G06F 3/0416 | 345/174 |

(56) References Cited

U.S. PATENT DOCUMENTS

| | | | | |
|---|---|---|---|---|
| 2015/0048851 A1* | 2/2015 | Erdogan | ............... | G06F 3/0416 324/679 |
| 2015/0103042 A1* | 4/2015 | Lee | ..................... | G06F 3/0418 345/174 |
| 2015/0130731 A1* | 5/2015 | Chang | .................. | G06F 3/0416 345/173 |
| 2015/0138145 A1* | 5/2015 | Hwang | ................ | G06F 3/0418 345/174 |
| 2015/0153868 A1* | 6/2015 | Tiew | ................... | G06F 3/0416 345/174 |

* cited by examiner

| | sensing frame | |
|---|---|---|
| | first phase | second phase |
| difference | IPGA0&IPGA1,IPGA2&IPGA3 .....IPGA12&IPGA13 | IPGA1&IPGA2,IPGA3&IPGA4 .....IPGA11&IPGA12 |
| downconvert &accumulate | first dc signal | second dc signal |
| AD convert | second dc signal ->digital signal | first dc signal ->digital signal |

CAPACITIVE TOUCH SENSING SYSTEM

BACKGROUND

1. Field of the Disclosure

This disclosure generally relates to an interactive input device and, more particularly, to a capacitive touch sensing system and an analog front end thereof.

2. Description of the Related Art

As the capacitive touch panel may achieve a better user experience, it has been broadly applied to various electronic devices such as a display device.

Figure 1:
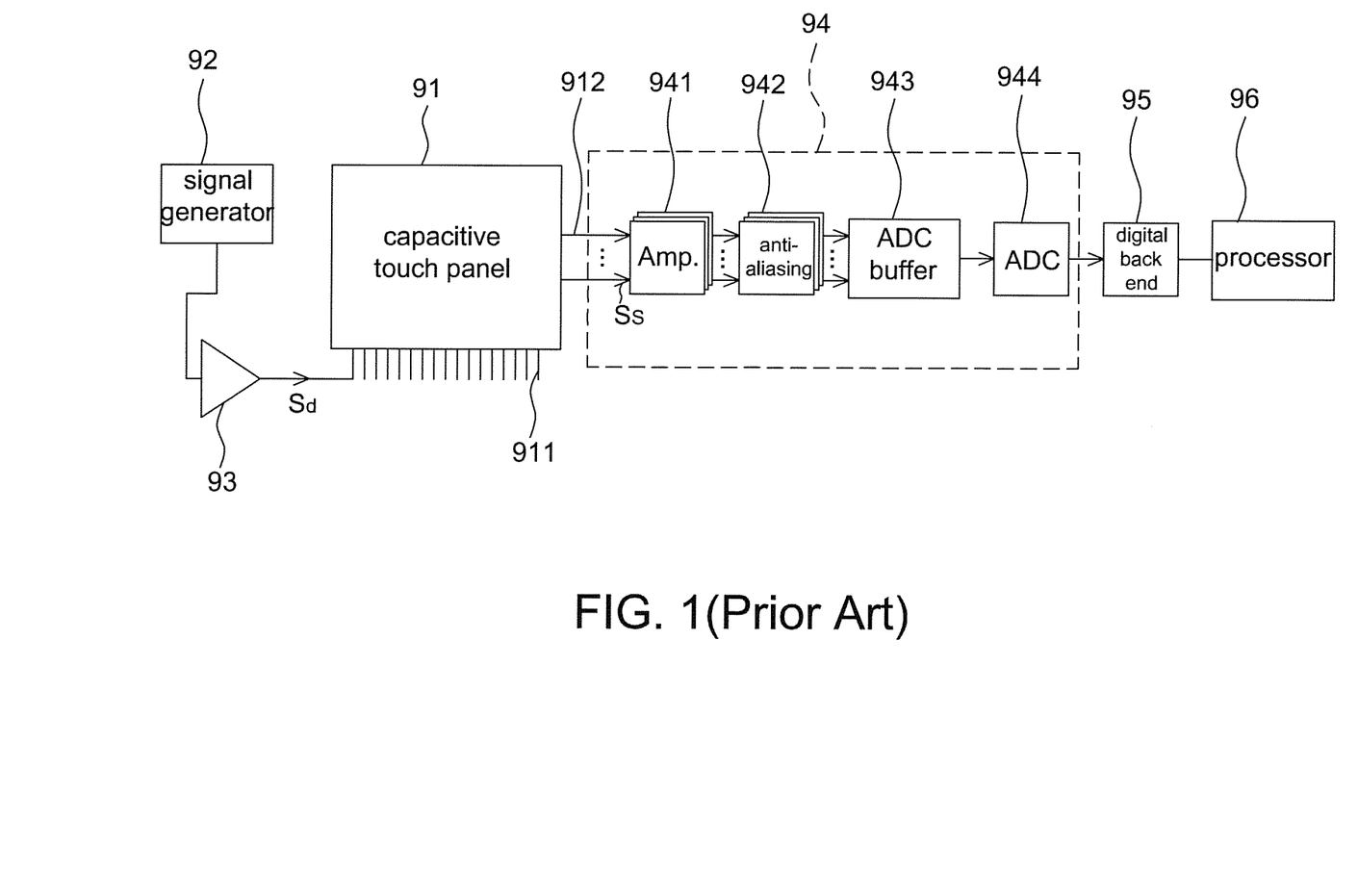
FIG. 1 shows a schematic block diagram of the conventional capacitive touch sensing system.

For example FIG. 1 shows a schematic block diagram of the conventional capacitive touch sensing system which includes a capacitive touch panel 91, a plurality of signal generators 92, a plurality of driving units 93, an analog front end 94, a digital back end 95 and a processing unit 96. The capacitive touch panel 91 includes a plurality of driving electrodes 911 intersecting with a plurality of sensing electrodes 912, wherein a mutual capacitance is formed between each of the driving electrodes 911 and each of the sensing electrodes 912. Each of the driving units 93 is coupled to one of the driving electrodes 911 for inputting a driving signal Sd generated by the associated signal generate 92. The sensing electrodes 912 output a sensing signal Ss, which is induced from the driving signal Sd through the mutual capacitance between the driving electrodes 911 and the sensing electrodes 912, to the analog front end 94. The analog front end 94 converts the sensing signal Ss to the digital signal which is then sent to the digital back end 95 for post-processing. The digital back end 95 is coupled to the processing unit 96 which identifies a touch position according to the post-processed result of the digital back end 95.

The analog front end 94 includes a plurality of amplification circuits 941, a plurality of anti-aliasing filters 942, an ADC buffer 943 and an AD converter 944, wherein the ADC buffer 943 is configured to buffer between the AD converter 944 and the anti-aliasing filters 942, and the anti-aliasing filters 942 are configured to reduce the signal noise outputted by the amplification circuits 941. In the above conventional technique, the sensing signal Ss is interfered by the electronic device in cooperation with the capacitive touch panel 91, e.g. the display device, to have high common mode noises. Generally speaking, as the touch signal outputted by the capacitive touch panel 91 is very small and in order to improve the identification ability of the touch signal in the environment with high common mode noises, the AD converter 944 having high resolution has to be employed. Meanwhile, in order to increase the signal-to-noise ratio, the oversampling technique is employed to sample the touch signal and as a high report rate has to be supported as well, the AD converter 944 has to operate at a high operating frequency. In addition, the anti-aliasing filters 942 and the ADC buffer 943 can increase the total chip area.

Accordingly, the present disclosure further provides a capacitive touch sensing system and an analog front end thereof that may decrease the required resolution and operating frequency of the AD converter and hence the power consumption as well as the chip area.

SUMMARY

The present disclosure provides a capacitive touch sensing system that includes a differential unit configured to perform the difference calculation between the sensing signals outputted by two adjacent sensing electrodes thereby reducing the required resolution of AD converter and eliminating the effect of phase delay in signal lines.

The present disclosure further provides a capacitive touch sensing system that includes a downconversion unit configured to downconvert the differential sensing signal substantially to the dc signal thereby reducing the required operating frequency of AD converter.

The present disclosure further provides a capacitive touch sensing system that removes a part of elements in the digital back end and replaces a part of elements in the analog front end so as to reduce the total chip area and power consumption.

The present disclosure provides a capacitive touch sensing system including a touch panel, a differential unit, a downconversion unit and an AD converter. The touch panel includes a plurality of driving electrodes intersecting with a plurality of sensing electrodes. The differential unit calculates a difference between sensing signals outputted by two adjacent sensing electrodes to output a differential signal. The downconversion unit is configured to demodulate the differential signal to generate a dc signal and to accumulate the dc signal. The AD converter is configured to convert the accumulated dc signal to a digital signal.

The present disclosure further provides a capacitive touch sensing system including a touch panel, a driving circuit, a differential unit, a downconversion unit and an AD converter. The touch panel includes a plurality of driving electrodes intersecting with a plurality of sensing electrodes. The driving circuit sequentially inputs a driving signal having a driving frequency to the driving electrodes. The differential unit calculates a difference between sensing signals outputted by two adjacent sensing electrodes to output a differential signal. The downconversion unit is configured to demodulate the differential signal with an operating frequency of 4 times of the driving frequency to generate a dc signal and to accumulate the dc signal. The AD converter is configured to convert the accumulated dc signal to a digital signal.

The present disclosure further provides an analog front end of capacitive touch sensing system including a differential unit, a downconversion unit and an AD converter. The differential unit calculates a difference between two sensing signals outputted by a capacitive touch panel and output a differential signal. The downconversion unit is configured to downconvert the differential signal to a dc signal. The AD converter is configured to convert the dc signal to a digital signal.

The present disclosure further provides a capacitive touch sensing system including a touch panel, a driving circuit, a downconversion unit and an AD converter. The touch panel includes a plurality of driving electrodes intersecting with a plurality of sensing electrodes. The driving circuit sequentially inputs a driving signal having a driving frequency to the driving electrodes. The downconversion unit is configured to demodulate sensing signals outputted by each of the sensing electrodes with an operating frequency of 4 times of the driving frequency to generate a dc signal and to accumulate the dc signal. The AD converter is configured to convert the accumulated dc signal to a digital signal.

The present disclosure further provides a capacitive touch sensing system including a touch panel, a plurality of amplification units, a differential unit and an AD converter. The touch panel includes a plurality of driving electrodes intersecting with a plurality of sensing electrodes. The plurality of amplification units are respectively coupled to the sensing electrodes for amplifying sensing signals outputted by the sensing electrodes. The differential unit calculates a difference between amplified sensing signals outputted by two adjacent amplification units to output a differential signal. The AD converter is configured to convert the differential signal to a digital signal.

In one aspect, the capacitive touch sensing system and the analog front end thereof further includes a plurality of amplification units respectively coupled to the sensing electrodes for amplifying the sensing signals outputted by the sensing electrodes and then outputting amplified sensing signals.

In one aspect, the differential unit and the downconversion unit may be integrated as an analog signal processing unit configured to sequentially perform the differencing, demodulation and accumulation on the amplified sensing signals outputted by two adjacent amplification units and generate the dc signal. In this manner, the AD converter having high resolution and operating frequency is no longer necessary.

In one aspect, the downconversion unit may include a demodulation unit and an accumulation unit. The demodulation unit demodulates the differential signal with two orthogonal signals. In one embodiment, the two orthogonal signals may be two signal arrays [1 0−1 0] and ±[0−1 0 1]. The accumulation unit accumulates a predetermined times of the dc signal.

In one aspect, the capacitive touch sensing system and the analog front end thereof further include a multiplexer coupled between the downconversion unit and the AD converter configured to provide the dc signal or accumulated dc signal of different channels to the AD converter for AD conversion.

In one aspect, a common mode rejection may further be provided between two adjacent amplification units configured to limit input common mode voltages of the two adjacent amplification units. In this manner, the amplification units may have a larger gain range and may use a smaller capacitor thereby reducing the chip area.

In one aspect, a common mode feedback may further be provided between two adjacent amplification units configured to maintain common mode levels of output voltages of the two adjacent amplification units to avoid signal distortion due to saturation.

Comparing to the conventional system, in the capacitive touch sensing system and the analog front end according to the embodiment of the present disclosure, a part of elements in the analog front end are replaced and a part of elements in the digital back end are removed so as to reduce the total chip area and power consumption. The AD converter only samples the dc value of the differential signal so as to reduce the resolution and operating frequency thereof and further to reduce the power consumption. In addition, as the common mode noises are removed, the amplification units may have a larger gain and use a smaller capacitor therein.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 2:
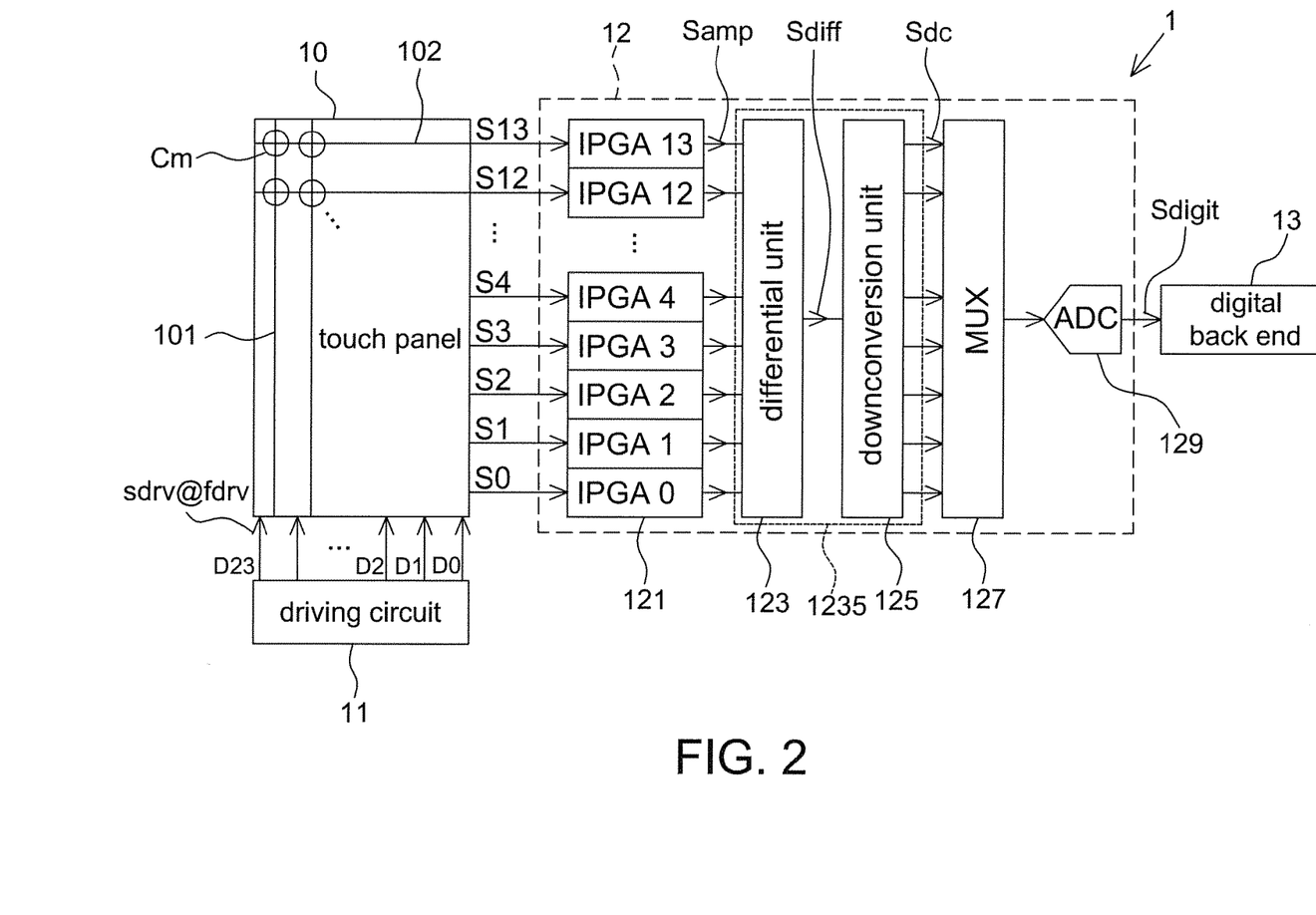
FIG. 2 shows a schematic block diagram of the capacitive touch sensing system according to an embodiment of the present disclosure.

Referring to FIG. 2, it shows a schematic block diagram of the capacitive touch sensing system according to an embodiment of the present disclosure. The capacitive touch sensing system 1 includes a touch panel 10, a driving circuit 11, an analog front end 12 and a digital back end 13, wherein the analog front end 12 is configured to preprocess the analog signal outputted by the touch panel 10 and convert the analog signal to the digital signal for being post-processed by the digital back end 13. Said preprocessing may include, for example, performing the amplification, differencing, downconversion, accumulation and AD conversion on the analog signal. Said post-processing may include, for example, identifying a touch position and/or a touch position variation (e.g. displacement) associated with the touch panel 10 according to the digital signal. In other words, the analog front end 12 is coupled between the touch panel 10 and the digital back end 13.

The touch panel 10 may be a capacitive touch panel which includes a plurality of driving electrodes 101 intersecting with a plurality of sensing electrodes 102 thereby generating mutual capacitance therebetween, e.g. one of the driving electrodes 101 may form a sensing cell Cm with one of the sensing electrodes 102 intersected thereto. The method of forming a plurality of driving electrodes and a plurality of sensing electrodes on a touch panel is well known and thus details thereof are not described herein. When a driving signal Sdrv is inputted to the driving electrodes 101, a sensing signal may be induced on the sensing electrodes 102 through the mutual capacitance. When at least one finger or operator is approaching the sensing cell Cm, the capacitance thereof is altered so as to change the sensing signal accordingly. In this manner, at least one touch position may be detected according to the variation of the mutual capacitance. The method of a capacitive touch panel inducing a sensing signal with respect to a driving signal Sdrv through the mutual capacitance is well known and thus details thereof are not described herein. The present disclosure is to provide a capacitive touch sensing system and an analog front end thereof capable of reducing the resolution and operating frequency of AD converter, the total power consumption and the chip area. It should be mentioned that extending directions of the driving electrodes 101 and the sensing electrodes 102 shown in FIG. 2 may be exchanged.

The driving circuit 11 sequentially inputs a driving signal Sdrv (e.g. D0-D23) which has, for example, a driving frequency fdrv to the driving electrodes 101, e.g. at least once to every driving electrode 101 within one sensing frame, wherein the driving signal Sdrv may be a square wave, sinusoidal wave or other suitable ac signals. The driving frequency fdrv may be within a range of 40 kHz-500 kHz, but not limited to and it may be determined according to different applications. The driving signal Sdrv is coupled to the sensing electrodes 102 through the mutual capacitance between the driving electrodes 101 and the sensing electrodes 102 so as to generate a sensing signal respectively (e.g. S0-S13). That is, in this embodiment the touch panel 10 is illustrated by an example of 14×24 size but the size of the touch panel 10 may be determined according to different applications. In other words, the analog front end 12 according to the embodiment of the present disclosure may be applied to a capacitive touch panel 10 having any size.

The analog front end 12 may include a plurality of amplification units 121, a differential unit 123, a downconversion unit 125, a multiplexer (MUX) 127 and an AD converter 129. It should be mentioned that although FIG. 2 shows that the differential unit 123 is separated from the downconversion unit 125, in other embodiments the differential unit 123 may be integrated in the downconversion unit 125. In other embodiments, if the touch panel 10 is integrated with signal amplifiers for amplifying sensing signals induced on the sensing electrodes, the amplification units 121 may not be implemented in the analog front end 12.

Figure 2A:
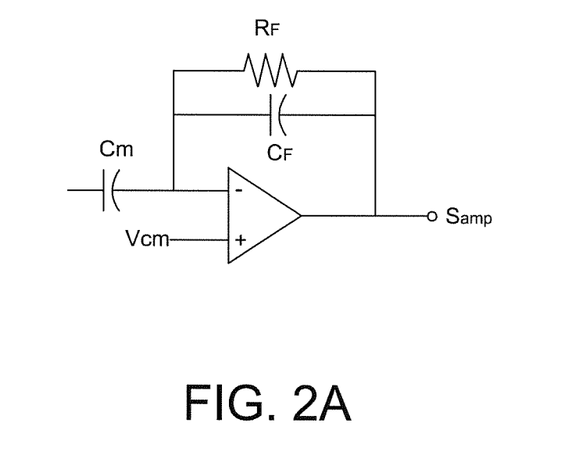
FIG. 2A shows a schematic circuit diagram of the amplification unit of the capacitive touch sensing system according to the embodiment of the present disclosure.

The amplification units 121 may respectively include an integrating programmable gain amplifier (IPGA). Each of the amplification units 121 is coupled to one of the sensing electrodes 102 and configured to amplify the sensing signal (S0-S13) and output an amplified sensing signal Samp. For example FIG. 2A shows one embodiment of the circuit diagram of the amplification units 121, wherein Cm indicates the mutual capacitance of the sensing cell Cm, Cm/$C_F$ determines the gain of the amplification units 121 and $R_F$×$C_F$ determines the high-pass cut-off frequency.

Figure 2B:
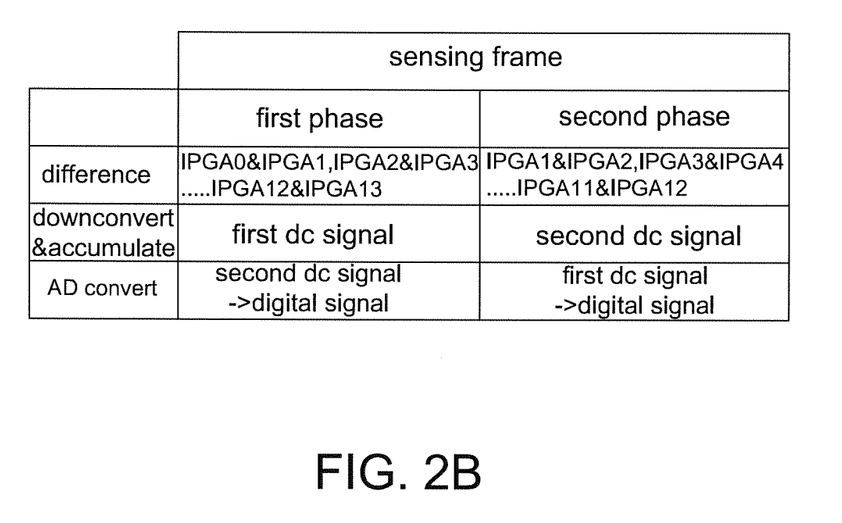
FIG. 2B shows an operational schematic diagram of the capacitive touch sensing system according to the embodiment of the present disclosure.

The differential unit 123 is configured to calculate the difference between the amplified sensing signals Samp of two adjacent amplification units 121 to output a differential signal Sdiff; for example, performing the difference calculation of the amplified sensing signals Samp between IPGA0 and IPGA1, between IPGA2 and IPGA 3, . . . , between IPGA12 and IPGA13 respectively so as to obtain IPGA0-IPGA1, IPGA2-IPGA3, . . . , and IPGA12-IPGA13. In this embodiment, as adjacent sensing electrodes 102 have similar line delay (e.g. RC delay) and common mode noises, the line delay and common mode noises are cancelled by performing the difference calculation. In addition, in order to maintain the panel sensing resolution, the differential unit 123 preferably calculates the difference between amplified sensing signals Samp of different groups of two adjacent amplification units 121 by two phases; for example as shown in FIG. 2B, in a first phase the differential unit 123 may calculate the difference between IPGA0 and IPGA1, between IPGA2 and IPGA3, . . . , and between IPGA12 and IPGA13 respectively, whereas in a second phase the differential unit 123 may calculate the difference between IPGA1 and IPGA2, between IPGA3 and IPGA4, . . . , and between IPGA11 and IPGA12 respectively so as to obtain IPGA1-IPGA2, IPGA3-IPGA4, . . . , and IPGA11-IPGA12. In this manner, the same panel sensing resolution is maintained even performing the difference calculation. It is appreciated that if the amplification units 121 are not implemented in the analog front end 12, the differential unit 123 is configured to calculate the difference between the sensing signals of two adjacent sensing electrodes 102.

The downconversion unit 125 is configured to downconvert the differential signal Sdiff substantially to a dc signal Sdc thereby reducing the required operating frequency of the AD converter 129. For example referring to FIG. 3, the downconversion unit 125 may include a demodulation unit 1251 configured to respectively demodulate the differential signal Sdiff with two orthogonal signals to generate two dc components Idc and Qdc. In one embodiment, the downconversion unit 125 may respectively demodulate the differential signal Sdiff with two signal arrays [1 0-1 0] and [0-1 0 1] or [1 0-1 0] and [0 1 0-1] and an operating frequency 4fdrv which is 4 times of the driving frequency fdrv so as to generate the two dc components Idc and Qdc. In order to increase the signal strength and eliminate the noise, the downconversion unit 125 may further include an accumulation unit 1252 configured to accumulate a predetermined times of the dc signal Sdc (i.e. the dc components Idc and Qdc) and output two accumulated dc components Iacc and Qacc. In this manner, the objectives of reducing the required resolution and speed of the AD converter 129 is achieved. In one embodiment, the accumulation unit 1252 may be implemented by the switched-capacitor integrator.

Figure 3:
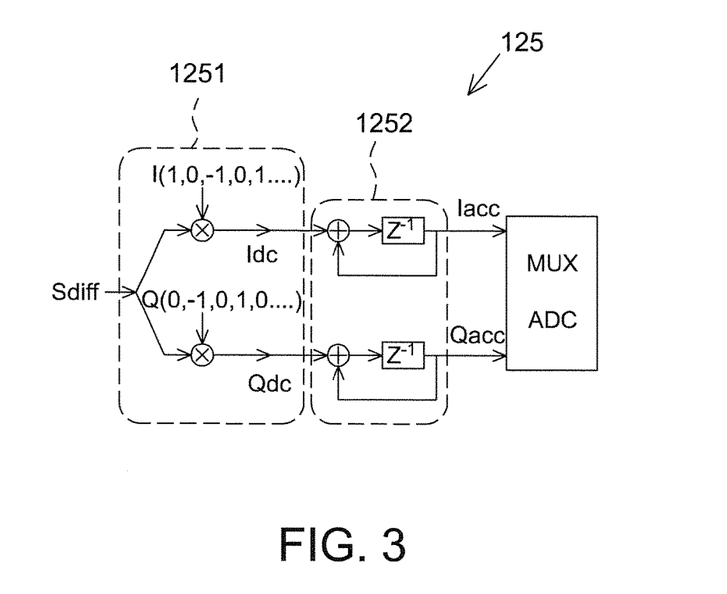
FIG. 3 shows an operational schematic diagram of the downconversion unit of the capacitive touch sensing system according to the embodiment of the present disclosure.
Figure 3A:
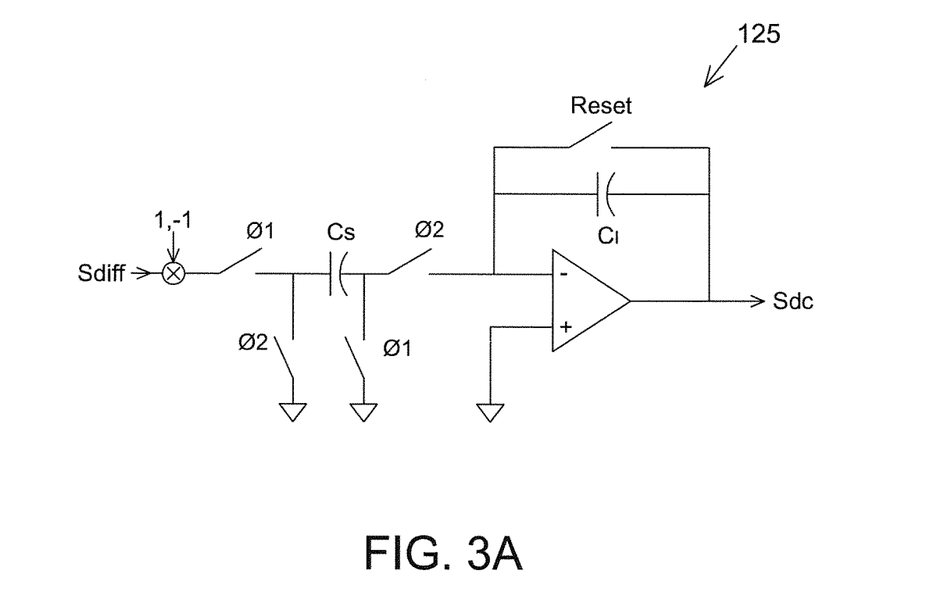
FIG. 3A shows a circuit diagram of the downconversion and accumulation unit of FIG. 3.

For example referring to FIG. 3A, it shows a schematic circuit diagram of the downconversion and accumulation unit in the capacitive touch sensing system 1 according to the embodiment of the present disclosure, wherein Sdc may be represented by $$Sdc = \frac{C_S}{C_I} \sum_{n=1}^{N} Sdiff(n) \qquad \text{equation (1)}$$

wherein N indicates the accumulated times. When two switching elements Φ1 are conducted simultaneously, the downconverted differential signals Idc and Qdc charge the capacitor $C_S$, whereas when two switching elements Φ2 are conducted simultaneously, charges in the capacitor $C_S$ are transferred to the capacitor $C_I$. By repeating this process N times, the downconverted and accumulated differential signals Iacc and Qacc (i.e. the accumulated dc signal Sdc) are outputted, wherein the switching elements Φ1 and Φ2 are conducted at different time intervals. It should be mentioned that FIG. 3A shows only single-ended implementation of one path (e.g. I or Q) of FIG. 3. In addition, when N=1, it means that the downconversion and accumulation unit directly output the dc signal Sdc without accumulation. It is appreciated that FIG. 3A is only intended to illustrate but not to limit the present disclosure.

As mentioned above, when the differential unit 123 is combined with the downconversion unit 125 to form an analog signal processing unit 1235, the analog signal processing unit 1235 is configured to demodulate a differential signal Sdiff of the amplified sensing signals Samp outputted by two adjacent amplification units 121 so as to generate a dc signal Sdc, or to further accumulate the dc signal Sdc in order to improve the signal strength and eliminate noises.

The multiplexer 127 is coupled between the downconversion unit 125 and the AD converter 129 and configured to couple the dc signal or the accumulated dc signal associated with each channel generated by the downconversion unit 125 to the AD converter 129 so as to perform the AD conversion. In this embodiment, said channel is referred to a sensing path formed by two adjacent amplification units 121 or two adjacent sensing electrodes.

The AD converter 129 converts the dc signal or the accumulated dc signal Sdc with an operating frequency to a digital signal Sdigit for being post-processed by the digital back end 13, e.g. identifying at least one touch position according to the digital signal using the digital back end 13. The operation of the AD converter 129 is well known to the art and thus details thereof are not described herein.

As the downconversion unit 125 may demodulate the differential signal Sdiff with two orthogonal signals to generate two dc signals Sdc and the AD converter 129 then outputs two digital signals Sdigit corresponding to each channel, the digital back end 13 may calculate a vector norm of the two digital signals to accordingly determine the touch position, e.g. calculating the vector norm by using the coordinate rotation digital computer (CORDIC). For example in one embodiment, when the touch panel 10 is not approached or touched by any object (i.e. no touch state), each channel has a predetermined norm, whereas when at least a part of channels of the touch panel 10 are approached or touched by at least one object (i.e. touch state), the norm corresponding to the part of the channels changes accordingly. The digital back end 13 (e.g. including a controller, micro processor, ASIC or CPU) may identify at least one touch position according to the variation of norm. The method of calculating the vector norm of two digital signals may be referred to U.S. patent application Ser. No. 13/746,883 assigned to the same assignee of the present application, but the present disclosure is not limited thereto.

As mentioned above, in order to maintain the sensing resolution of the panel, the differential unit 123 may perform the difference calculation on different groups of the amplification units 121 within different time intervals of one sensing frame. For example referring to FIG. 2B again, when the differential unit 123 is calculating the difference between the amplified sensing signals of a first group of two adjacent amplification units (e.g. IPGA0 and IPGA1, IPGA2 and IPGA3, . . . , IPGA12 and IPGA13), the downconversion unit 125 (or the downconversion and accumulation unit) generates first dc signals whereas when the differential unit 123 is calculating the difference between the amplified sensing signals of a second group of two adjacent amplification units (e.g. IPGA1 and IPGA2, IPGA3 and IPGA4, . . . , IPGA11 and IPGA12), the downconversion unit 125 (or the downconversion and accumulation unit) generates second dc signals. When the downconversion unit 125 is generating the first dc signals, the AD converter 129 is configured to convert the second dc signals to digital signals whereas when the downconversion unit 125 is generating the second dc signals, the AD converter 129 is configured to convert the first dc signals to digital signals. As mentioned above, if the amplification units 121 are not implemented in the analog front end 12, the differential unit 123 is configured to calculate the difference between the sensing signals of two adjacent sensing electrodes 102.

Figure 4:
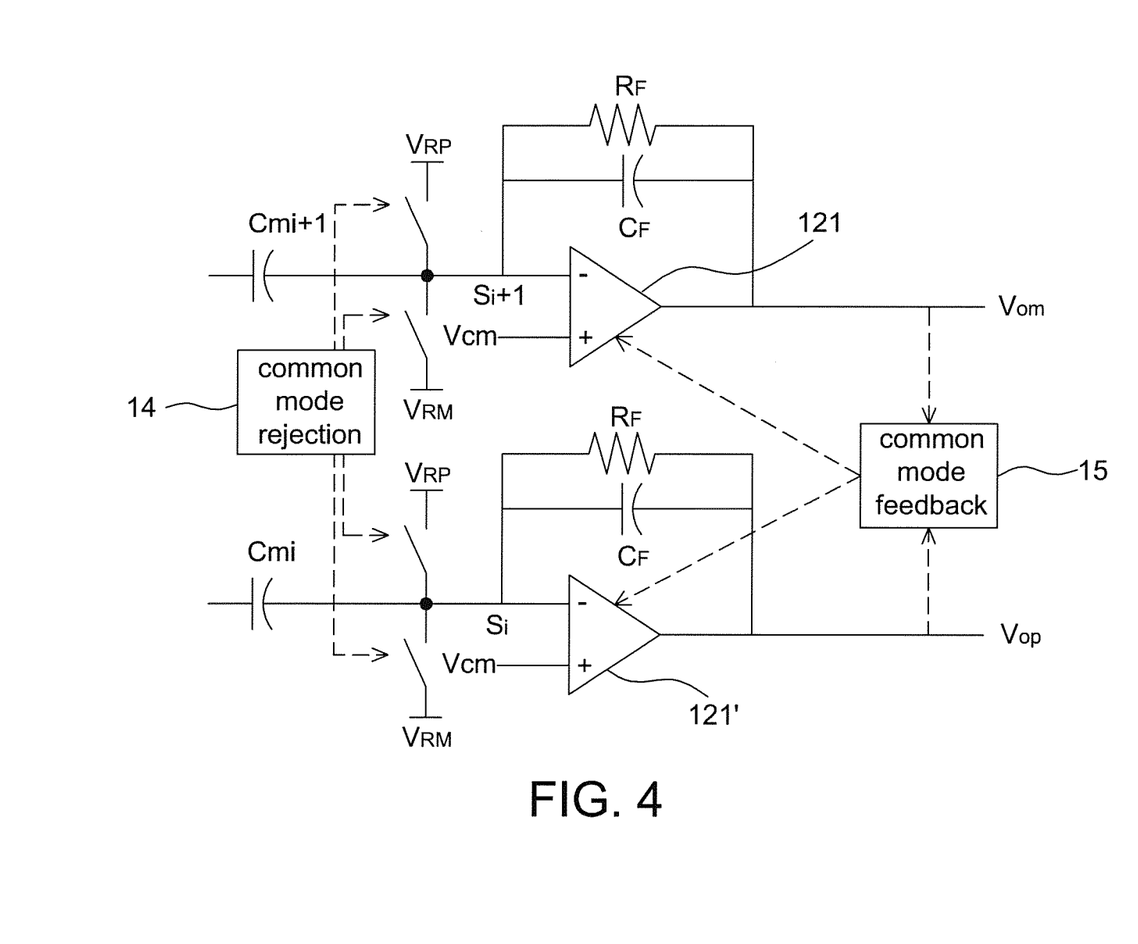
FIG. 4 shows a schematic diagram of the common mode rejection and the common mode feedback in the capacitive touch sensing system according to the embodiment of the present disclosure.

Referring to FIG. 4, in order to further eliminate the common mode noises, in one embodiment the capacitive touch sensing system and the analog front end thereof may further include a common mode rejection 14 between two adjacent amplification units 121 and 121' configured to limit input common mode voltages of the two adjacent amplification units 121 and 121' to about Vcm. In another embodiment, a common mode feedback 15 may further be included between two adjacent amplification units 121 and 121' configured to maintain common mode levels of output voltages of the two adjacent amplification units 121 and 121' to a range between Vheadroom to (VDD−Vheadroom), where VDD is the supply voltage and Vheadroom is the headroom necessary to ensure amplification units 121 and 121' remain in the linear region. It is appreciated that the common mode rejection 14 and the common mode feedback 15 may be implemented simultaneously. In this manner, the gain range of the amplification units 121 is increased such that the capacitance $C_F$ (as shown in FIG. 2A) may be decreased thereby reducing the chip area.

For reducing the chip area and the power consumption, a part of the elements in the analog front end 1 shown in FIG. 2 may not be implemented.

In one embodiment, the differential unit 123 may not be implemented such that the downconversion unit 125 may demodulate sensing signals S0-S13 outputted by each of the sensing electrodes 102, for example, but not limited to with an operating frequency of 4 times of a driving frequency fdrv of the driving signal Sdrv, so as to generate a dc signal Sdc and to accumulate the dc signal. If a plurality of amplification units 121 are respectively coupled to the sensing electrodes 102 for amplifying the sensing signals S0-S13 outputted by the sensing electrodes 102, the downconversion unit 125 may demodulate amplified sensing signals Samp outputted by each of the amplification units 121. In this embodiment, the AD converter 129 may work at a much lower speed so as to reduce the power consumption as the accumulation of the dc signal may boost the signal strength by N times and lower the AD conversion speed by N times. The resolution requirement of the AD converter 129 is lowered due to a higher SNR so as to reduce the power consumption and the chip area. In addition, some downconversion and filtering performed in the analog front end 1 and digital back end 13 may work at a lower speed, the power consumption and the chip area in the digital back end 13 may be reduced. As mentioned above, the downconversion unit 125 demodulates the sensing signals S0-S13 with two orthogonal signals, for example, but not limited to two signal arrays [1 0−1 0] and ±[0−1 0 1], to generate two dc signals and the AD converter 129 outputs two digital signals Sdigit associated with each of the sensing electrodes 102. In addition, other parts are similar to FIG. 2 and its corresponding descriptions.

In one embodiment, the downconversion unit 125 may not be implemented such that the AD converter 129 is configured to convert differential signals Sdiff between two amplified sensing signals Samp of two adjacent amplification unit 121 to a digital signal Sdigit. In this embodiment, the analog front end 1 may also operate in two phases as shown in FIG. 2B; for example, the differential unit 123 sequentially calculates the difference between amplified sensing signals Samp of a first group of two adjacent amplification units (e.g. IPGA0 and IPGA1, IPGA2 and IPGA3, . . . , IPGA12 and IPGA13) and a second group of two adjacent amplification units (e.g. IPGA1 and IPGA2, IPGA3 and IPGA4, . . . , IPGA11 and IPGA12); when the differential unit 123 is calculating the difference between the amplified sensing signals Samp of the first group of two adjacent amplification units, the AD converter 129 is configured to convert the differential signals Sdiff associated with the second group of two adjacent amplification units to digital signals Sdigit whereas when the differential unit 123 is calculating the difference between the amplified sensing signals Samp of the second group of two adjacent amplification units, the AD converter 129 is configured to convert the differential signals Sdiff associated with the first group of two adjacent amplification units to digital signals Sdigit; i.e. the first dc signal in the third row of FIG. 2B is replaced by differential signals associated with the first group of two adjacent amplification units and the second dc signal in third row of FIG. 2B is replaced by differential signals associated with the second group of two adjacent amplification units. In this embodiment, the IPGA having a larger gain and smaller capacitance (CF) may be used so as to reduce the chip area. In addition, the single-to-differential conversion circuit for IPGAs is no longer necessary, the power consumption and chip area may be reduced. In this embodiment, a multiplexer 127 may be coupled between the differential unit 123 and the AD converter 129. In addition, other parts are similar to FIG. 2 and its corresponding descriptions.

As mentioned above, the conventional analog front end of capacitive touch sensing system has to employ the AD converter having high resolution and operating frequency so as to distinguish the tiny touch signal from high common mode noises and improve the signal-to-noise ratio and a high power is consumed. Therefore, the present disclosure further provides a capacitive touch sensing system and an analog front end thereof (FIG. 2) that may reduce the required resolution and operating frequency of AD converter by employing an analog signal processing unit. In addition, as a part of functions of the digital back end are moved to the analog front end and the operating frequency of the digital back end is decreased, a part of elements of the digital back end may be removed so as to reduce the chip area and the power consumption as well.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A capacitive touch sensing system, comprising:
   a touch panel comprising a plurality of driving electrodes intersecting with a plurality of sensing electrodes configured to form a plurality of channels each associated with two adjacent sensing electrodes;
   a differential unit configured to calculate a difference between sensing signals output by two adjacent amplification units directly coupled to the two adjacent sensing electrodes of each channel to output a differential signal;
   a downconversion unit coupled downstream of the differential unit and configured to
      receive the differential signal and demodulate the differential signal, wherein the demodulation creates a first signal path with one of two orthogonal signals to generate one of two dc component signals in the first signal path, and the demodulation creates a second signal path with another one of the two orthogonal signals to generate another one of the two dc component signals in the second signal path, and
      accumulate the one of the two dc component signals in the first signal path and the another one of the two dc component signals in the second signal path to generate two accumulated dc component signals each in one of the first signal path and the second signal path; and
   an AD converter coupled downstream of the downconversion unit and configured to convert the accumulated two dc component signals to two digital signals,
      wherein each pair of the two dc component signals corresponds to one of the plurality of channels associated with two adjacent sensing electrodes.

2. The capacitive touch sensing system as claimed in claim 1, wherein the differential unit is integrated in the downconversion unit.

3. The capacitive touch sensing system as claimed in claim 1, wherein the downconversion unit comprises an accumulation unit configured to accumulate a predetermined times of the two dc component signals.

4. The capacitive touch sensing system as claimed in claim 1, wherein the downconversion unit is configured to demodulate the differential signal with two signal arrays [1 0 -1 0] and [0 -1 0 1] respectively.

5. The capacitive touch sensing system as claimed in claim 1, further comprising a multiplexer coupled between the downconversion unit and the AD converter.

6. The capacitive touch sensing system as claimed in claim 1, wherein the amplification units are respectively coupled to the sensing electrodes and configured to amplify the sensing signals output by the sensing electrodes.

7. The capacitive touch sensing system as claimed in claim 6, further comprising a common mode rejection connected between the two adjacent amplification units and configured to limit input common mode voltages of the two adjacent amplification units.

8. The capacitive touch sensing system as claimed in claim 6, further comprising a common mode feedback connected between the two adjacent amplification units and configured to maintain common mode levels of output voltages of the two adjacent amplification units.

9. The capacitive touch sensing system as claimed in claim 1, further comprising a digital back end configured to identify a touch position according to the two digital signals.

10. The capacitive touch sensing system as claimed in claim 9, wherein the digital back end is configured to calculate a vector norm of the two digital signals to accordingly identify the touch position.

11. A capacitive touch sensing system, comprising:
    a touch panel comprising a plurality of driving electrodes intersecting with a plurality of sensing electrodes configured to form a plurality of channels each associated with two adjacent sensing electrodes;
    a driving circuit sequentially inputting a driving signal having a driving frequency to the driving electrodes;
    a differential unit configured to calculate a difference between sensing signals output by two adjacent amplification units directly coupled to the two adjacent sensing electrodes of each channel to output a differential signal; and
    a downconversion unit coupled downstream of the differential unit and configured to demodulate the differential signal with two orthogonal signals to generate two dc component signals.

12. The capacitive touch sensing system as claimed in claim 11, wherein the amplification units are respectively coupled to the sensing electrodes and configured to amplify the sensing signals output by the sensing electrodes.

13. A capacitive touch sensing system, comprising:
    a touch panel comprising a plurality of driving electrodes intersecting with a plurality of sensing electrodes to form a plurality of channels each associated with two adjacent sensing electrodes;
    a plurality of amplification units respectively coupled to the sensing electrodes and configured to amplify sensing signals output by the sensing electrodes;
    a differential unit configured to calculate a difference between amplified sensing signals output by the two adjacent amplification units associated with each channel to output a differential signal;
    a downconversion unit coupled downstream of the differential unit and configured to receive the differential signal and demodulate the differential signal, wherein the demodulation creates a first signal path with a first signal to generate a first dc component signal in the first signal path, and the demodulation creates a second signal path with a second signal, which is orthogonal to the first signal, to generate a second dc component signal in the second signal path, and accumulate the first dc component signal in the first signal path to generate a first accumulated dc component signal in the first signal path, and accumulate the second dc component signal in the second signal path to generate a second accumulated dc component signal in the second signal path; and an AD converter configured to convert the first and second accumulated dc component signals to digital signals.

14. The capacitive touch sensing system as claimed in claim 13, further comprising a common mode rejection connected between the two adjacent amplification units and configured to limit input common mode voltages of the two adjacent amplification units.

15. The capacitive touch sensing system as claimed in claim 13, further comprising a common mode feedback connected between the two adjacent amplification units and configured to maintain common mode levels of output voltages of the two adjacent amplification units.

16. The capacitive touch sensing system as claimed in claim 13, further comprising a multiplexer coupled between the differential unit and the AD converter.

* * * * *